INVENTOR
LUIGI VACCA
BY Vernon F. Hauschild
ATTORNEY

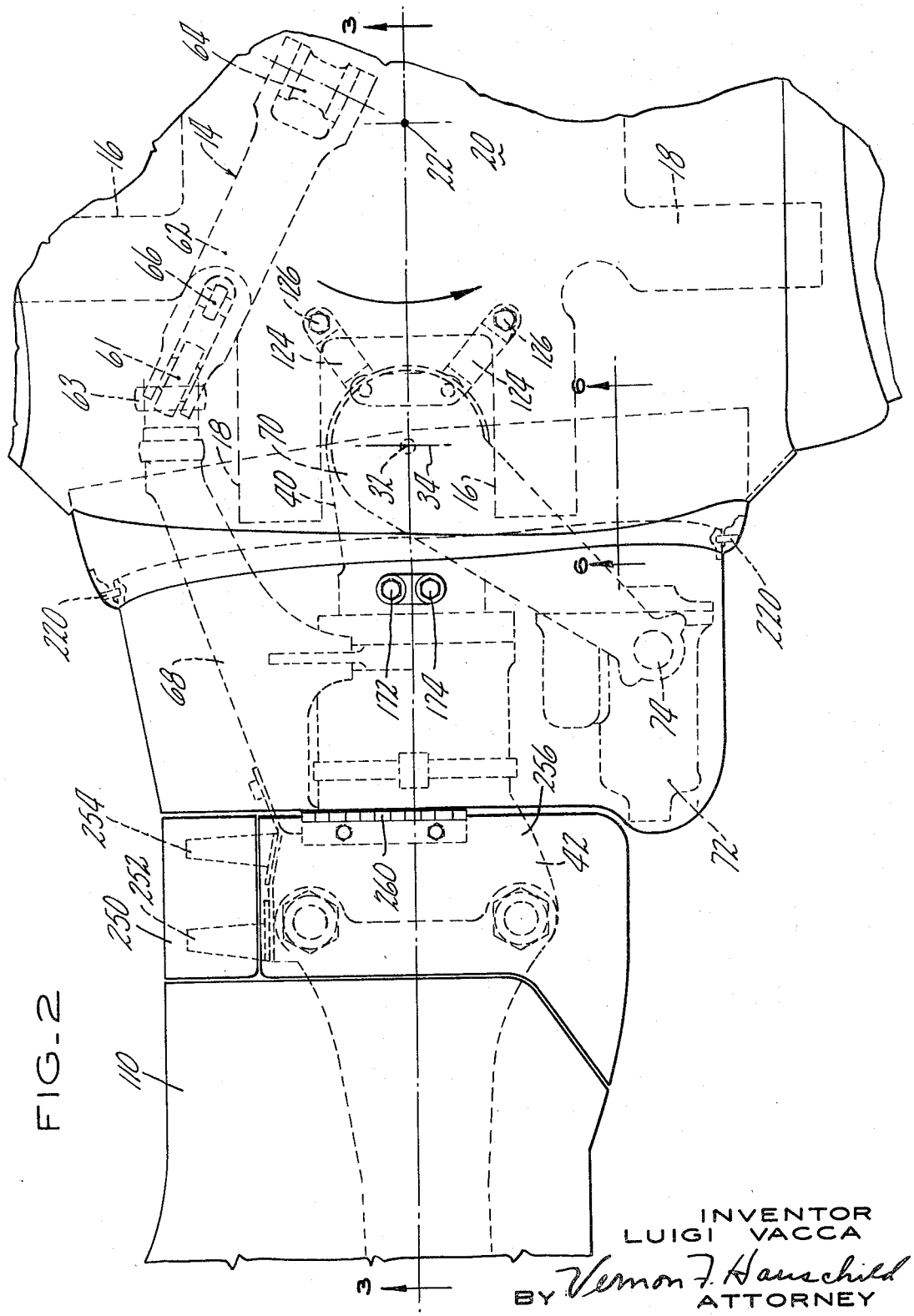

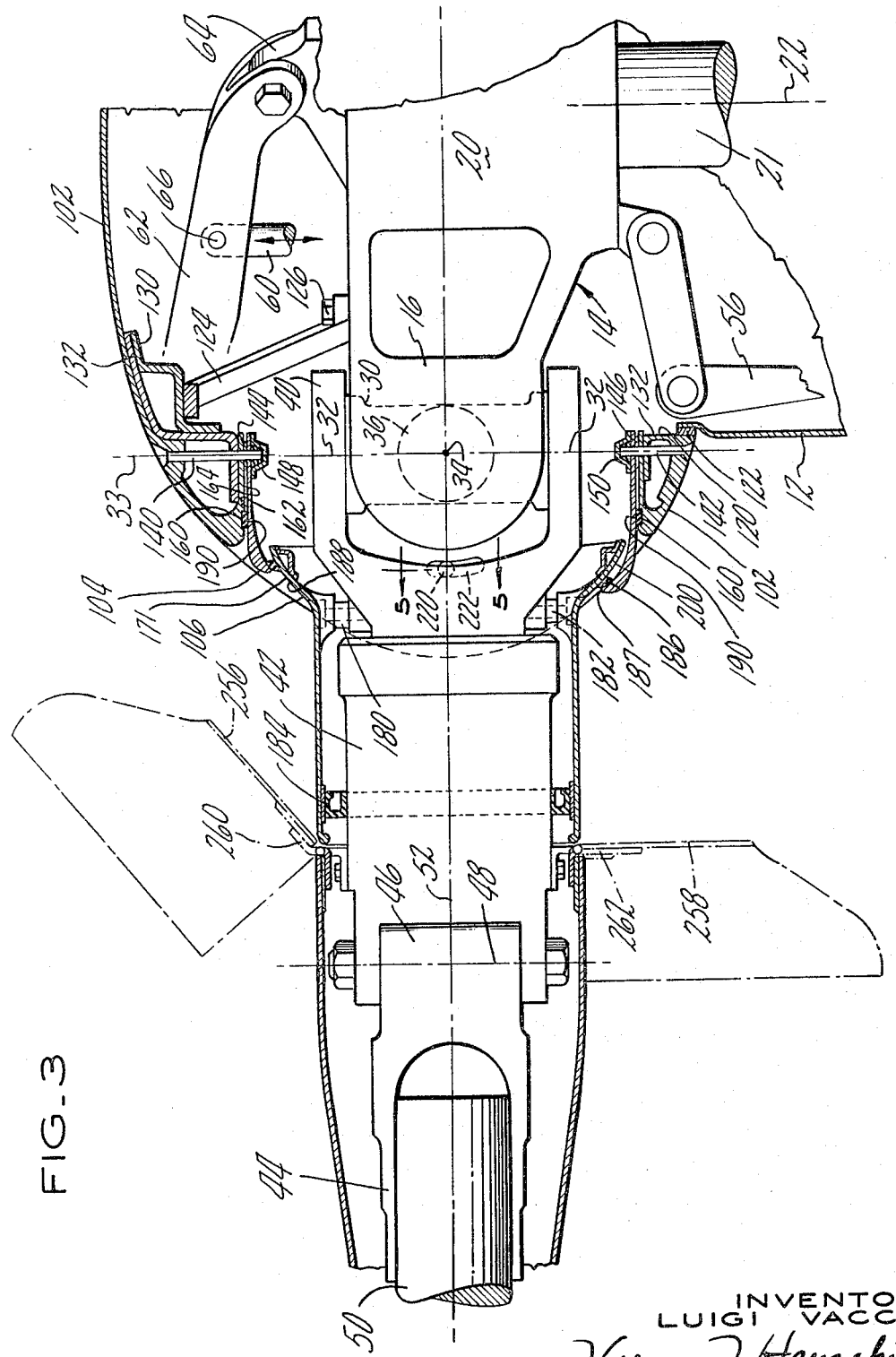

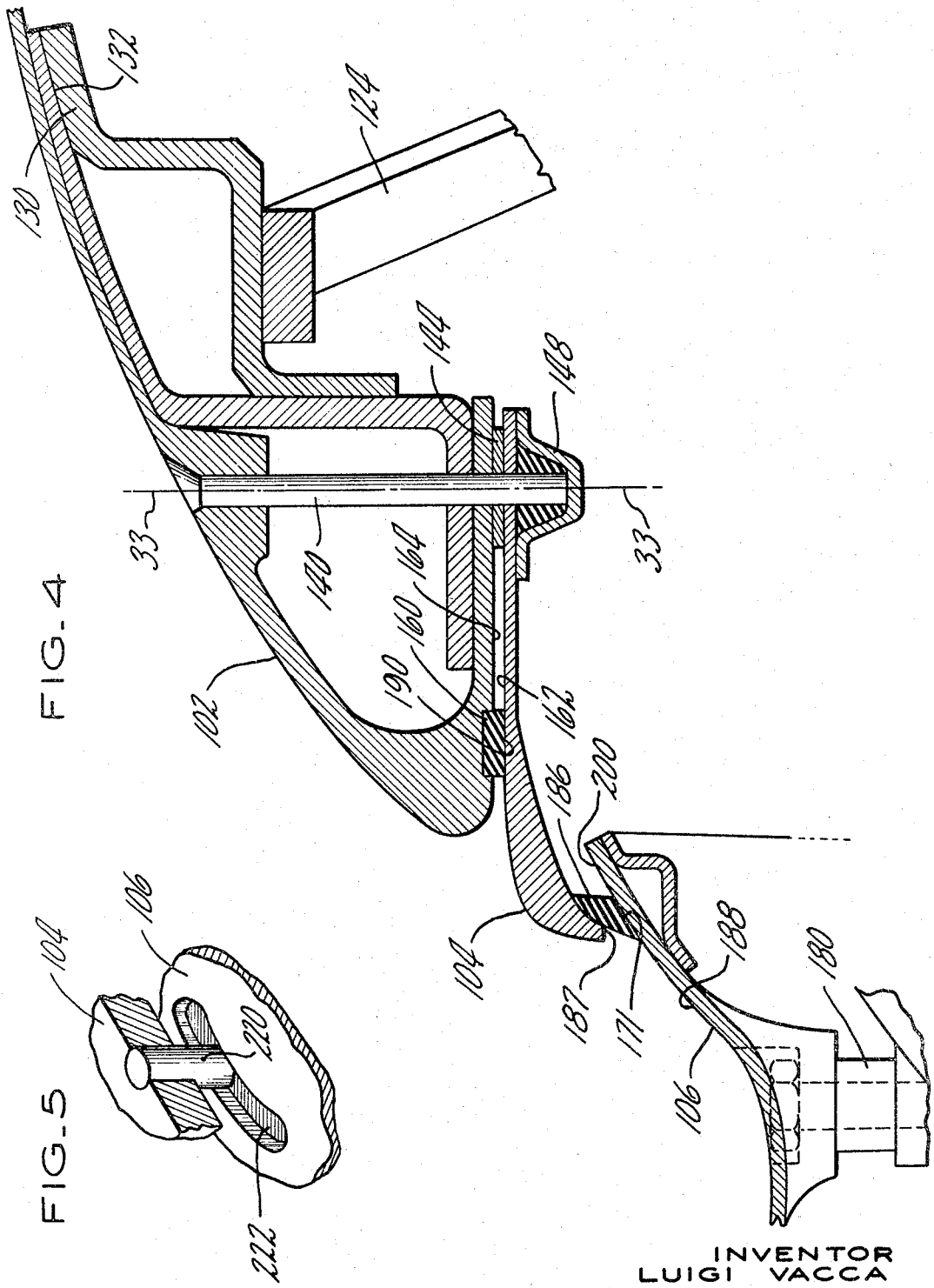

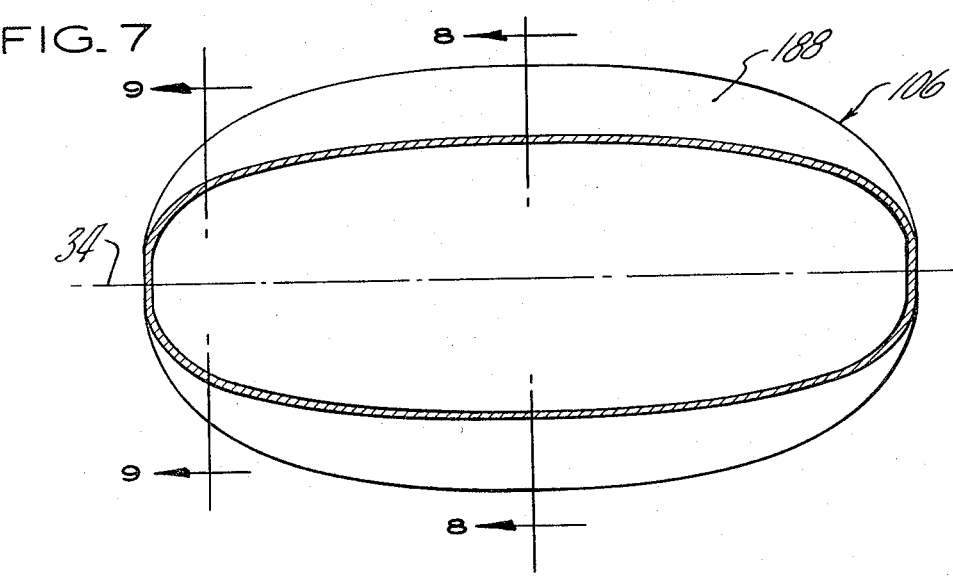
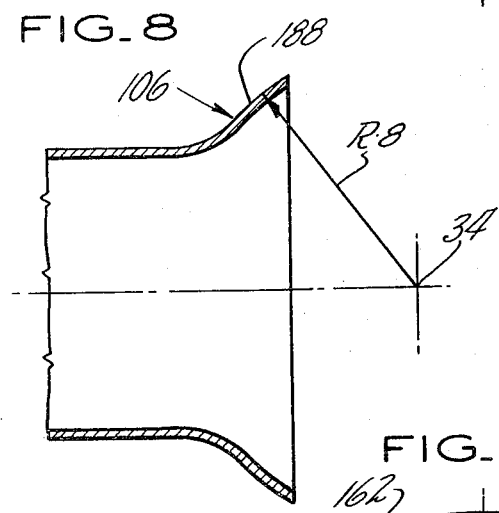
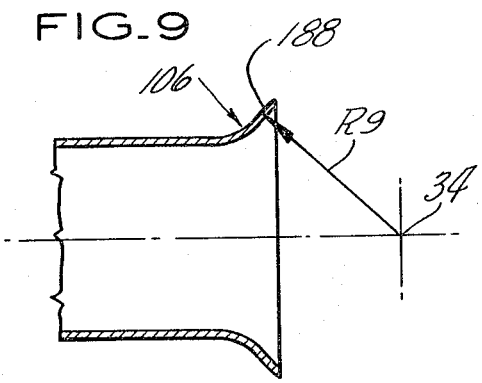
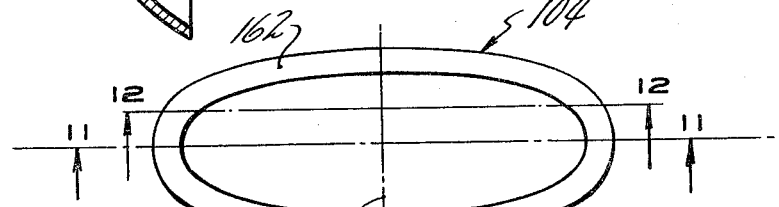
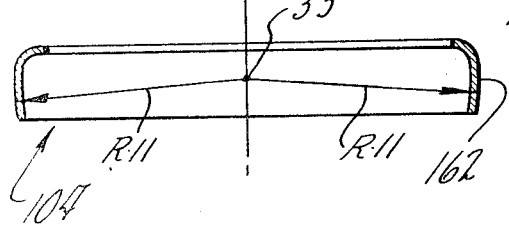
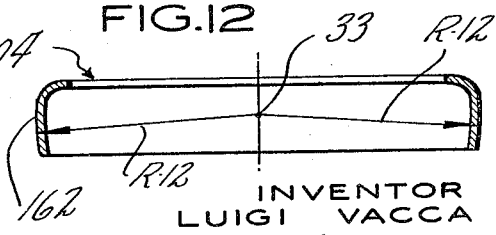

United States Patent Office 3,310,120
Patented Mar. 21, 1967

3,310,120
ROTOR HEAD FAIRING FOR ARTICULATED AIRCRAFT ROTOR
Luigi Vacca, Milford, Conn., assignor to United Aircraft Corporation, East Hartford, Conn., a corporation of Delaware
Filed Feb. 24, 1966, Ser. No. 538,492
21 Claims. (Cl. 170—160.56)

This invention relates to a fairing for a rotor head and more particularly to a fairing for a fully articulated rotor head.

It is an object of this invention to provide a rotor head located externally of an aircraft, which rotor head and its associated blades are fully articulated, that is, capable of pitch change motion about the feathering axis, lead-lag or hunting motion about the lead-lag axis, and flapping motion about the flapping axis, and which rotor head has a fairing of nearly optimum aerodynamic shape without cutouts for blade motion.

It is a further object of this invention to teach a fairing for a fully articulated rotor head, which fairing has a main member rigidly attached directly to the rotor head for rotation therewith about the axis of rotation of the rotor head, and further has two sleeves for each blade or blade connecting mechanism projecting from the rotor head, with one such sleeve mounted for pivotal motion about either the flapping or lead-lag axes and the second sleeve mounted for pivotal motion about the other of the lead-lag or flapping axes.

It is a further object of this invention to teach such a rotor head fairing wherein the blade pitch change mechanism is completely enveloped within the fairing.

It is still a further object of this invention to provide such a fairing in which one of the aforementioned sleeves forms a socket joint with the aforementioned rigid fairing, which socket joint, or the area of sweep between the parts forming the socket joint as relative motion take place between these parts, is circular in shape in sections taken perpendicular to either the lead-lag axis or the flapping axis and wherein both of the aforementioned sleeves coact to form a second socket joint, which second socket joint or the area of sweep between the parts forming the socket joint as relative motion takes place between these parts, is circular in shape in sections taken perpendicular to the other of the lead-lag axis or the flapping axis.

It is still a further object of this invention to provide such a rotor head fairing wherein one of the aforementioned sleeves is supported by the aforementioned main fairing member and wherein the other of the aforementioned sleeves is supported by the blade spindle.

It is still a further object of this invention to teach such a rotor head fairing wherein one of the sleeves moves in flapping motion with the flapping mass and wherein both of the sleeves move in lead-lag motion with the blades and further wherein both of the sleeves are caused to move in unison during lead-lag motion either by a pin and slot connection between the sleeves or by interference or kinematic binding which will take place in one of the aforementioned socket joints when one of the sleeves attempts to move in lead-lag motion.

It is still a further object of this invention to teach such a rotor head fairing in which there are no drag creating openings or open cutouts in the fairing, which fairing creates a minimum profile and in which sealing exists in the aforementioned socket joints.

Another object of this invention is to provide such a fairing which will protect a rotor head including its associated operating mechanism against weather damage.

A further object of this invention is to provide such a rotor head fairing which will improve the top speed capabilities of an aircraft and increase fuel economy.

Another object of this invention is to provide such a rotor head fairing which will produce a reduction in drag of the rotor head.

A further object of this invention is to reduce turbulence behind the rotor head and thereby reduce aircraft vibrations.

Another object of this invention is to provide such a rotor head fairing which is attached to the rotor head rather than to other structure of the aircraft.

It is still a further object to teach such a fairing which includes provisions for blade folding and in which additional portions of fairing are attached to the blade sleeve to envelop the blade folding hinge and to move with the blade in pitch changing motion, and which additional fairing may be pivoted away from the blade to permit blade folding.

It is still a further object of this invention to provide such a rotor head fairing which includes a lead-lag sleeve, a flapping sleeve and a blade fold portion and wherein the blade fold portion only moves with the blade relative to the two sleeves in pitch change motion, and further wherein the blade fold portion and the flapping sleeve move with the blade relative to the lead-lag sleeve in blade flapping motion, and still further wherein the blade fold portion, the flapping sleeve and the lead-lag sleeve move together with the blade in lead-lag motion.

Other objects and advantages will be apparent from the specification and claims, and from the accompanying drawings which illustrate an embodiment of the invention.

FIG. 2 is a partial top view of a rotor head system illustrating the fairing of this invention and illustrating certain pertinent portions of the rotor head thereunder in phantom.

FIG. 3 is a side view, partially in section, of my rotor head fairing and also illustrates pertinent portions of the rotor head.

FIG. 4 is an enlarged cross-sectional showing of my rotor head fairing to illustrate the flapping sleeve and the lead-lag sleeve in relation to the rigid portion of the fairing attached to the rotor head.

FIG. 5 is a perspective view taken along line 5—5 of FIG. 3.

FIG. 7 is a showing of the flapping sleeve.

FIG. 8 is a section along line 8—8 of FIG. 7.

FIG. 9 is a view taken along line 9—9 of FIG. 7.

FIG. 10 is a reduced size showing of the lead-lag sleeve.

FIG. 11 is a view taken along line 11—11 of FIG. 10.

FIG. 12 is a view taken along line 12—12 of FIG. 10.

Figure 1:
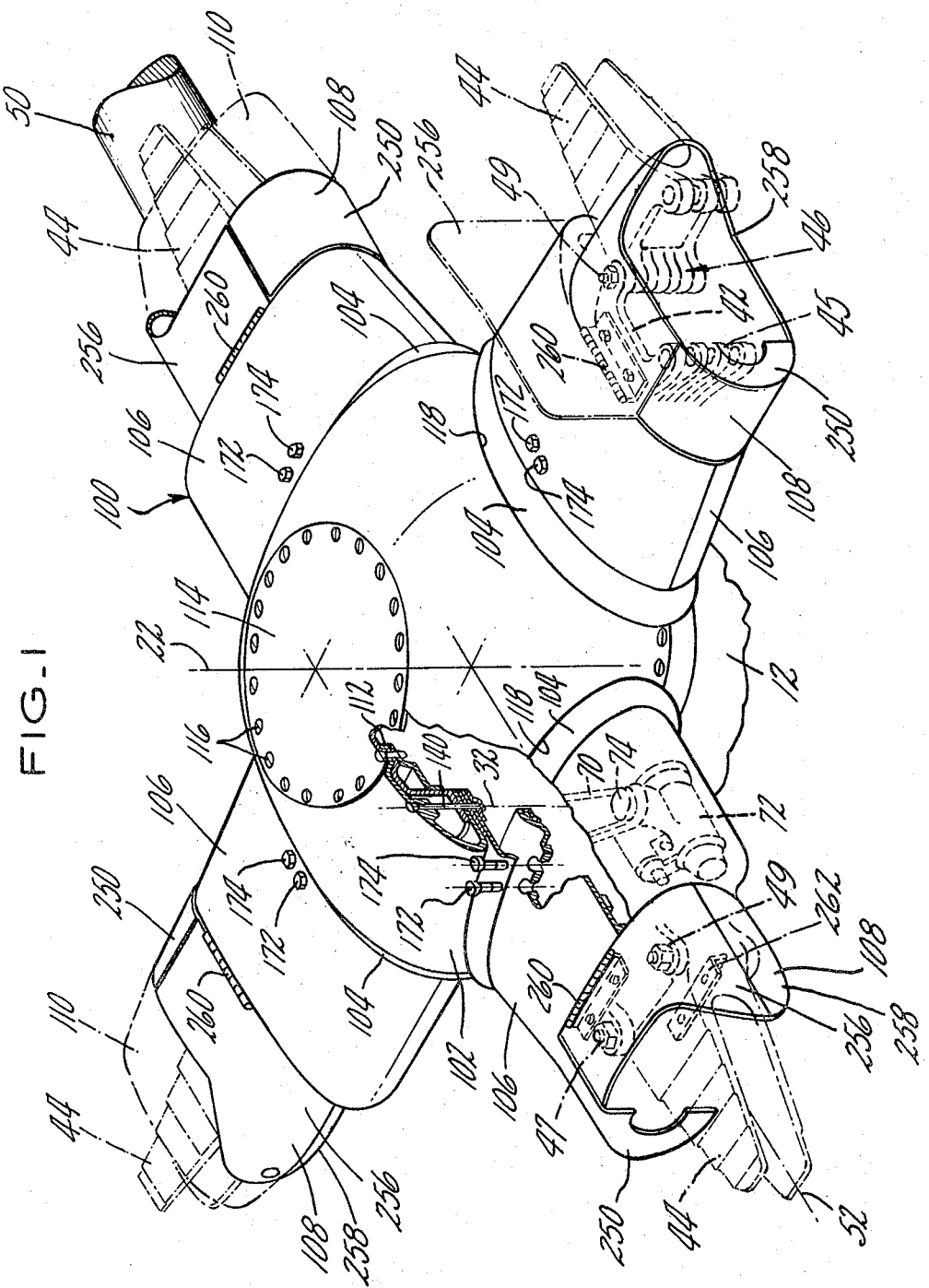
FIG. 1 is a perspective showing, partially broken away, of a rotor system including a rotor head projecting from an aircraft and with a rotor fairing incorporating the invention.

Referring to FIGS. 1, 2 and 3, these figures show the top portion of an aircraft with a pylon 12 extending therefrom and with a rotor system generally indicated as 14 extending from pylon 12. Rotor 14 consists generally of a pair of hinge lugs 16 and 18 integral with hub 20, supported on a shaft 21 for rotation about the rotor center line or axis of rotation 22. The hub 20 is formed having a like pair of lugs 16 and 18 extending therefrom for each blade 50. The lugs 16 and 18 cooperate to form a support for flapping pin 36 for each blade to permit the blade to pivot about flapping axis 34. The blades are also supported by lead-lag pin 30 for rotation about blade lead-lag axis 32. Blade lead-lag hinge 30 is also commonly referred to as the drag hinge and the blade pivoting thereabout is said to be going through a hunting motion. Spindle 40 extends from the blade lead-lug pin 30, which together and in combination with lugs 16 and 18 and pin 36 form a universal-type joint, thus permitting full articulation of blade 50.

The spindle 40 projects into the interior of rotatably mounted sleeve 42. Sleeve 42, bifurcated blade cuff 44, which is connected to sleeve 42 at hinge joint 46 for blade folding action about folding axis 48, and rotor blade 50, which project from and are supported by bifurcated cuff 44, are free to rotate about feathering axis 52 to thereby change blade pitch.

Rotating scissors 56 connect the rotating swash plate (not shown) to hub 20. Control rods 60 connect the rotating swash plate (not shown) to pitch control beams 62 at pivot point 66. The inner end of control beam 62 is pivotally attached to the rotor head at station 64. The outer end of the control beam 62 is connected by rod end bearings 61 and 63 and interconnecting rod (not shown) to pitch horn 68 which connects to sleeve 42 to vary blade pitch in conventional fashion, as fully described in U.S. Patent No. 2,638,994. Such a pitch horn and pitch control beam arrangement is provided for each blade 50. Upper and lower blade damper supports 70 (FIG. 2) (lower not shown) project from spindle 40, and attach to damper cylinder 72 at station 74. Damper cylinder 72 includes a piston and piston rod therewithin which piston rod is attached to an extension of fixed hinge pin 36 (FIG. 3) such that damper 72 serves to damp lead-lag or hunting motion of the blades about lead-lag axis 32. Dampers such as 72 are described in greater particularity in U.S. Patent No. 2,755,872.

Cuff 44, which carries blade 50 is of the folding type and, is attached to sleeve 42 by a pair of hinge joints 45 and 46, as best shown in FIG. 1, including bolt pins 47 and 49. When it is desired to fold the blades, the pin 47 is removed manually and the blade 50 is folded about hinge 46 as shown in FIG. 1.

It is highly desirable for the reasons given supra in the objects and most particularly for aerodynamic reasons, to envelop the rotor 14 within a fairing. While a general rotor fairing is disclosed in U.S. Patent No. 3,217,811, assigned to assignee, it has been found that substantial aerodynamic loss is encountered due to the open blade cutouts or apertures in the fairing through which the rotor blades project. Wind tunnel tests conducted by Sikorsky Aircraft have shown that the equivalent flat plate area of a rotor fairing with open blade cutouts can be reduced by 30% when the cutouts are closed around the blades.

It is accordingly an important teaching of this invention to provide a rotor fairing which eliminates the aforementioned cutouts and yet which permits complete freedom of the fully articulated rotor for blade flapping, lead-lag, and pitch change motions.

As best shown in FIG. 1, may fairing is designated generally as 100 and includes fairing 102 rigidly attached to the rotor head 14, lead-lag sleeves 104, flapping sleeves 106 and blade fold fairing section 108.

If desired, additional fairings such as 110 (FIG. 2) may be positioned around and carried by blades 50. While still viewing FIG. 1, it will be noted that the rigid fairing portion 102 has a substantially circular aperture 112 in the top thereof to receive inspection plate 14, which is attached to rigid fairing 102 by screw-type members 116. Fairing 102 also includes cutouts 118 from which lead-lag sleeves 104 project.

As best shown in FIG. 3, rigid fairing 102 has aperture 120 in the bottom thereof to receive pylon 12 of the aircraft in sealing engagement due to the action of seal 122. A plurality of brackets 124 extend between rigid fairing 102 and hinge lugs 16 and 18 of rotor head 14 and are attached to each, for example, by bolt members 126 so that the rigid fairing 102 is supported from the rotor head 14 and is attached thereto so as to rotate therewith about the axis of rotation 22. Flanges 130 and 132 serve to stiffen fairing 102.

Fairing 102 has as many cutouts or apertures 118 therein as there are blades projecting from the rotor head therethrough. Apertures 118 will form the same symmetric pattern about rotational axis 22 as do the rotor blades 50.

A lead-lag sleeve 104 projects from and overlaps with each aperture 118 to form socket joint 190 therebetween and is pivotally attached by pins 140 and 142 (FIG. 3) to fairing 102 along sleeve lead-lag axis 33.

The lead-lag axis 33 of the sleeve 104 and the lead-lag axis 32 of the blade 50 are coincident when the blade is at the horizontal or zero degree flapping angle. The blade lead-lag axis 32, however, tilts as the blade flapping angle changes. This deviation of the blade lead-lag axis 32 from the fixed sleeve lead-lag axis 33 does not affect the operation of sleeve 104 with the present blade suspension because the blade flapping axis 34, blade lead-lag axis 32, and sleeve lead-lag axis 33 all intersect at one point regardless of blade or sleeve positions. Blade motions center upon this point. For this reason sleeve 104 will respond to horizontal motions of the blade without regard to the tilting of the blade lead-lag axis 32. Pins 140 and 142 pass through washers 144 and 146 and are received in pocket members 148 and 150 on sleeve 104 so that the lead-lag sleeve 104 is attached to the fairing 102 so as to be pivotable about sleeve lead-lag axis 33.

Seal member 160 preferably extends between the outer surface 162 of sleeve 104 and the inner surface 164 of aperture 118.

Each flapping sleeve 106 is partially enveloped by a lead-lag sleeve 104 and extends therefrom to be supported by blade spindle 40 by means of bolts 172 and 174, which are received in threaded holes in bosses 180 and 182. As previously described, spindle 40 is supported to be pivotable about flapping axis 34 so that flapping sleeve 106 is also pivotable thereabout. Although there is a deviation of the blade flapping axis and the axis about which the flapping sleeve moves whenever the blade leads or lags the radial position, I have not attempted to speak of the blade and sleeve flapping axes distinctively. In all drawing figures shown, these axes are coincident. The outer end of flapping sleeve 106 is supported in spaced relation from blade sleeve 42 by support ring member 184. Peripheral seal member 186 (FIG. 6) preferably seals between lead-lag sleeve 104 and flapping sleeve 106. The outer surface 188 of sleeve 106 forms socket joint 200 with sleeve 104.

The shape of the parts which define socket joint 190 between cutout 118 of fairing 102 and lead-lag sleeve 104, and socket joint 200 between lead-lag sleeve 104 and flapping sleeve 106 are very important to my fairing arrangement and will now be considered in detail.

With respect to socket joint 190, it will be realized that lead-lag sleeve 104 must be able to move in pivot motion about lead-lag axis 33 while remaining in close proximity to and not binding with cutout 118. This may be accomplished with more than one physical embodiment, but the concept of operation is the same throughout.

Figure 13:
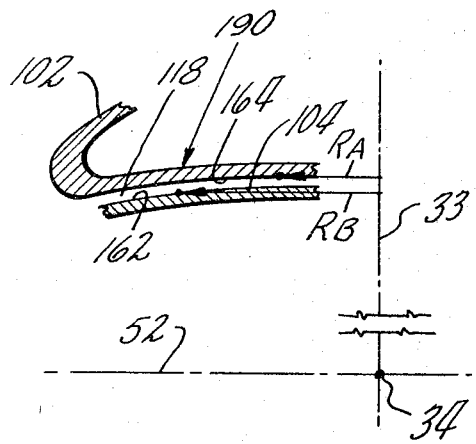
FIG. 13 shows one embodiment for the socket joint between the rigid fairing and one of the sleeves.

Referring to FIG. 13 we see a first arrangement by which socket joint 190 may be made. In the FIG. 13 arrangement, the inner surface 164 of cutout 118 of fairing 102 and the outer surface 162 of lead-lag sleeve 104 are contoured so that sections taken in each surface 164 and 162 in planes perpendicular to lead-lag axis 33 will define circles about axis 33, as illustrated by radius lines $R_A$ and $R_B$. Surfaces 162 and 164 are positioned in close proximity to one another so that no substantial drag creating gap exists therebetween, however, due to the special shape of these surfaces just described it will be noted that as lead-lag sleeve 104 pivots about axis 33, surfaces 162 and 164 will remain in the same close proximity without binding. It will be evident that this precise contouring of surfaces 162 and 164 is necessary only in the area of sweep, that is in the area of overlap which exists between these two parts as the parts move relative to one another. If a seal such as 160 is used, the area of sweep is the area of surface 162 wiped by seal 160.

Figure 14:
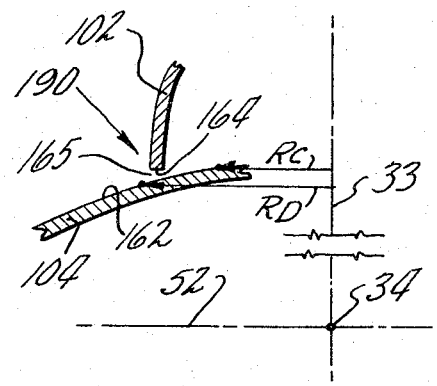
FIG. 14 shows another embodiment for the socket joint between the rigid fairing and one of the sleeves.

Socket joint 190 may also be formed as shown in FIG. 14 wherein the outer surface 162 of lead-lag sleeve 104 is formed in the same fashion as described in connection with FIG. 13 so that all sections taken therethrough in planes perpendicular to axis 33 are circular concentrically about axis 33. Inner surface 164 of fairing 102 defines cutout 118. Fairing 102 envelops sleeve 104 so that inner surface 164 envelops the outer surface 162 of sleeve 104 in close proximity about the full periphery thereof to form peripheral aperture 165 therebetween. While it may be considered that the very short inner wall 164 shown in FIG. 14 may constitute a portion of the corresponding surface 164 in FIG. 13, such is not absolutely necessary, in fact, fairing 102 could end in a knife-edge, if desired, in defining peripheral aperture 165. In this FIG. 14 construction, fairing 102 performs the function of defining inner wall 164 which coats with the outer surface 162 of sleeve 104 to define peripheral aperture 165 therebetween. In defining socket joint 190, aperture 118 defined by inner surface 164 of fairing 102 may first be determined, and then the outer surface 162 of sleeve 104 may be contoured to be in close proximity thereto and shaped so that planes passing through surface 162 are circular in sections perpendicular to lead-lag axis 33, such as illustrated by radii $R_C$ and $R_D$. The reverse could also be true wherein the outer surface 162 of sleeve 104 is first defined as just described and then the inner surface 164 of fairing 104 is defined to cooperate therewith to define peripheral aperture 165 therebetween. Either of these procedures could also be used in defining socket joint 200. It will be evident that in the FIG. 14 construction, sleeve 104 may pivot about axis 33 while remaining in close proximity to inner surface 164 of fairing 102 at all times and yet not bind therewith. Again, it will be evident that this precise contouring of the outer surface 162 is necessary only in the area of sweep or overlap of surface or knife edge 164 of fairing 102 and surface 162 of sleeve 104.

If it is desired to have no clearance between fairing 102 and lead-lag sleeve 104, such may be accomplished by extending a seal between these two parts. It will be evident that such a seal could be used in either the FIG. 13 or FIG. 14 construction and it will be noted that such a seal 160 is, in fact, used in the embodiment shown in FIGS. 3 and 4. Seal 160 may either be a completely flexible seal which will bear against and assume the shape of the outer surface 162 of sleeve 104 or it may be contoured so as to present an inner surface of the shape described in connection with inner surface 164 of fairing 102 in the FIG. 13 configuration. The area of sweep when a seal is used is the area on surface 162 wiped by the seal 160.

The shape of the outer surface 162 of the lead-lag sleeve 104 will be described in greater particularity by referring to FIGS. 10–12. It will be realized that the shape of the inner surface 164 of fairing 102 in the FIG. 13 construction and the inner surface of seal 162, if a contoured seal, would be shaped in the same fashion. FIG. 10 shows lead-lag sleeve 104 as it is mounted to pivot about sleeve lead-lag axis 33. It is important to the construction of this fairing that the outer surface 162 (FIG. 4) of sleeve 104 be shaped so that all sections taken therethrough perpendicular to the sleeve lead-lag axis 33 will be circular within the wiping region of the seal 160. For example, the section taken along line 11—11 of FIG. 10 is shown in FIG. 11 and it will be noted that the arcs described at each end thereof are of constant radius $R_{11}$ about sleeve lead-lag axis 33. In similar fashion, FIG. 12 shows that a section taken along line 12—12 also produces a cross section as shown in FIG. 12 which is of constant radius $R_{12}$ about sleeve lead-lag axis 33. Accordingly, the socket joint 190 (FIGS. 3, 4, 13 and 14) formed between the outer surface 162 of sleeve 104 and the inner surface of seal member 160 or the inner surface 164 of fairing 102 intersect planes perpendicular to the sleeve lead-lag axis 33 in circular sections.

Figure 15:
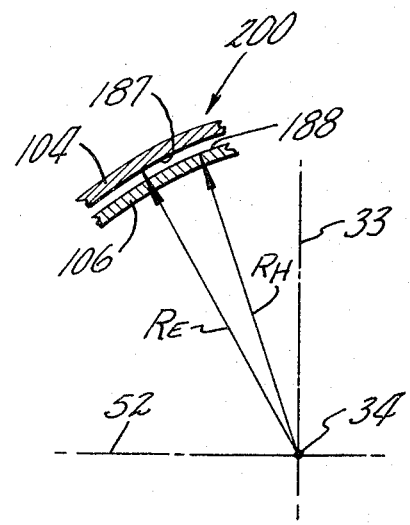
FIG. 15 shows one embodiment for the socket joint between the two sleeves which form part of my fairing.

With respect to socket joint 200 between lead-lag sleeve 104 and flapping sleeve 106, it will be realized that this socket joint may also be made in more than one fashion. FIG. 15 illustrates one embodiment of socket joint 200 in which the inner surface 187 of sleeve 104 and the outer surface 188 of sleeve 106 are contoured so that all sections taken therethrough perpendicular to flapping axis 34 are circular, as depicted by radii $R_E$ and $R_H$. Surfaces 187 and 188 are positioned in close proximity to one another so that there is no drag creating space therebetween, however, so that sleeve 106 may pivot about flapping axis 34 while maintaining this presently selected clearance with surface 187 throughout its travel without binding therewith.

Figure 16:
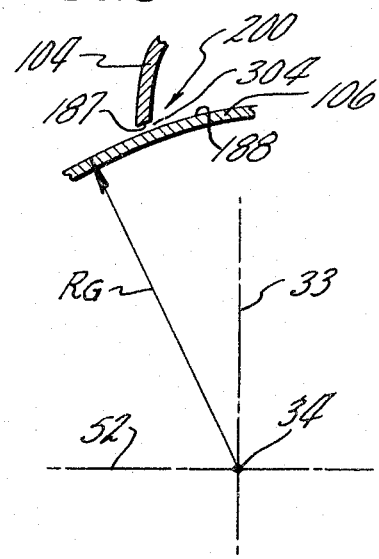
FIG. 16 shows another embodiment of the socket joint between the two sleeves which form part of my fairing.

By viewing FIG. 16, we see another embodiment of socket joint 200. In the FIG. 16 configuration, surface 188 of flapping sleeve 106 is formed in the same fashion as surface 188 of FIG. 15, for example, to be at constant radius $R_G$ about flapping axis 34 at the section illustrated. Lead-lag sleeve 104 presents a thin inner surface 187 which is in close proximity to surface 188 throughout the full periphery thereof to define a selected peripheral aperture 304 therebetween. Again, while surface 187 in FIG. 16 may constitute a portion of the specially spaced surfaces 187 of FIG. 15, such is not altogether necessary and, in fact, sleeve 104 could end in a knife-edge in defining aperture 304. In the FIG. 16 configuration it will be evident that sleeve 106 is free to pivot about flapping axis 34 with respect to sleeve 104 while maintaining close proximity to surface 187 at all times and without binding therewith. The area of sweep in the FIGS. 15 and 16 embodiment is the area of overlap between surfaces 187 and 188 as sleeve 106 rotates about flapping axis 34 relative to sleeve 104.

Figure 6:
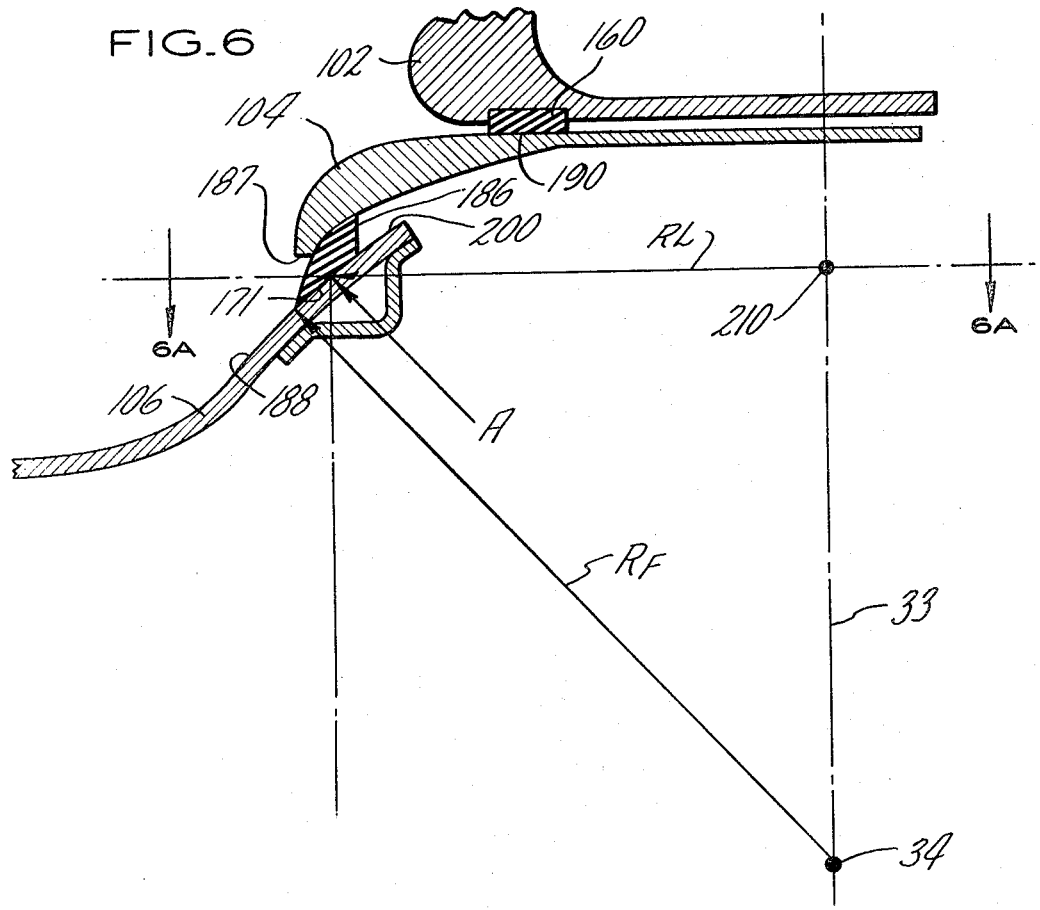
FIG. 6 is a cross-sectional view taken along the line 6—6 of FIG. 2, showing the rigid fairing, the flapping sleeve and the lead-lag sleeve.

If it is desired to eliminate our clearance between sleeves 104 and 106 in socket joint 200, it will be evident that a seal may be positioned between surfaces 187 and 188 of both the FIG. 15 and FIG. 16 configuration and that, in fact, such a seal 186 is used in the preferred embodiment shown in FIGS. 3, 4 and 6. Seal 186 may be either a flexible peripheral seal bearing against and assuming the contour of outer surface 188 of sleeve 106 or may be a specially contoured sleeve having an inner surface 171 corresponding in shape to the inner surface 187 of the FIG. 15 embodiment. Again, the area of sweep in the sealed construction is the area of surface 188 wiped by seal 186.

The shape of the outer surface 188 of the flapping sleeve 106 will be described in greater particularity by referring to FIGS. 7–9. It will be understood that the inner surface 187 of sleeve 104 in the FIG. 15 embodiment and the inner surface of seal 186, if a contoured seal is used, will be shaped in the same fashion. FIG. 7 illustrates flapping sleeve 106 supported to be pivotable about flapping axis 34. FIGS. 8 and 9 show that sections taken through sleeve 106 at station 8—8 and 9—9 perpendicular to flapping axis 34 produce circular sections of radius $R_8$ and $R_9$, respectively. Accordingly, the socket joint 200 (FIG. 4) formed between the outer surface 188 of flapping sleeve 106 and the inner surface 171 of seal member 186 or the inner surface 187 of sleeve 104 intersect in circular sections in planes perpendicular to the flapping axis 34.

It should be noted, as best shown in FIG. 3, that if blade 50 flaps about flapping axis 34, flapping sleeve 106 will be carried in flapping motion by blade spindle 40 and, the lead-lag sleeve 104 will not move therewith.

As mentioned previously, both flapping sleeve 106 and lead-lag sleeve 104 move in unison with lead-lag motion of blade 50 and this may be accomplished by pins 220 (FIGS. 2 and 5) projecting from lead-lag sleeve 104 into arcuate slots 222 in flapping sleeve 106. The pin and slot construction is best shown in FIG. 5. As best shown in FIG. 3, it will be noted that when flapping sleeve 106 moves in flapping motion, pin 220 will move along arc 222 so that lead-lag sleeve 104 remains stationary. If, however, blade 50 goes into lead-lag motion, pin 220 will bear against the walls of slot 222 and cause the two sleeves 106 and 104 to move in unison in a lead-lag motion.

Due to the particular shape of socket joint 200, pins 220 and slots 222 are not essential to cause sleeves 106 and 104 to move in unison in lead-lag motion. This is best explained by referring to FIGS. 6 and 6A.

Figure 6A:
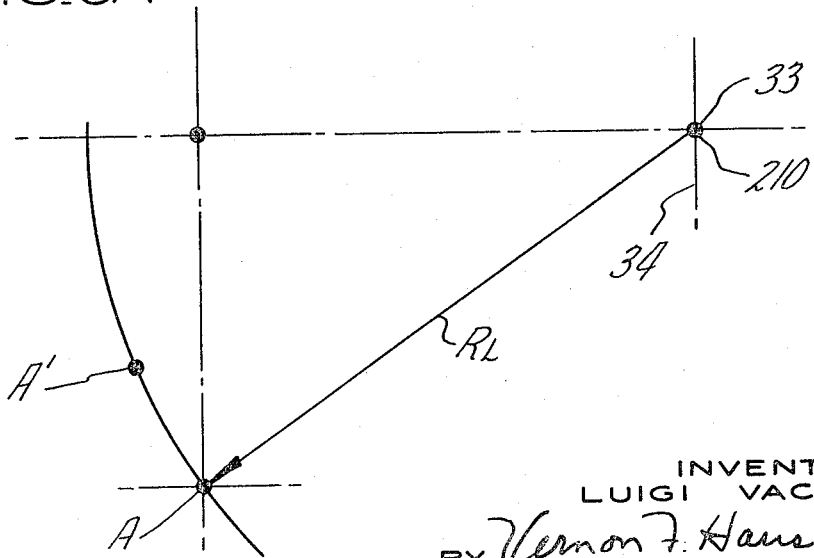
FIG. 6A is a view taken along line 6A—6A of FIG. 6 and is used in conjunction with FIG. 6 to illustrate how the socket joint between the flapping sleeve and the lead-lag sleeve will kinematically bind and cause the sleeves to move in unison in lead-lag motion.

Referring to FIGS. 6 and 6A, it will be shown that flapping sleeve 106 can move independently of lead-lag sleeve 104 in flapping motion but that kinematic binding will occur at socket joint 200 between the sleeves when flapping sleeve 106 attempts to move in lead-lag motion, thereby causing the two sleeves to move in unison in lead-lag motion.

FIG. 6 shows that the outer surface 188 of flapping sleeve 106 is dimensioned to be of constant radius $R_F$ about flapping axis 34. Accordingly, because the inner surface 171 of seal 186 or the inner surface 187 of sleeve 104, and hence socket joint 200, are also of this constant radius $R_F$ about flapping axis 34, flapping sleeve 106 may move about flapping axis 34 free of lead-lag sleeve 104 since surface 171 of seal 186 will merely bear thereagainst in sealing relation but will not interfere with the flapping motion.

Contrary to this freedom of flapping motion, FIGS. 6 and 6A will be used to show that flapping sleeve 106 cannot move free of sleeve 104 in lead-lag motion, due to kinematic binding at socket joint 200. FIG. 6A depicts point A as a point in socket joint 200 which is accordingly both on the inner surface 187 of sleeve 104 or the inner surface 171 of seal 186 and also on the outer surface 188 of sleeve 106. As flapping sleeve 106 attempts to move in lead-lag motion, point A will follow the path of an arc of constant radius $R_L$ about lead-lag axis 32 and more particularly about point 210 on axis 33. In following such a constant radius $R_L$ arc, point A must move to point A' as illustrated in FIG. 6A. Point A' is forward of socket joint 200 and accordingly, for sleeve 106 to be able to move in lead-lag motion so as to move point A to point A', sleeve 106 must carry lead-lag sleeve 104 therewith due to the kinematic binding which occurs therebetween. It will, therefore, be seen that sleeves 106 and 104 must move in unison during lead-lag motion of blade 50. As previously described in connection with FIGS. 3 and 5, pins 220 and arcuate slots 222 may be used to insure the simultaneous movement of sleeves 104 and 106 in lead-lag motion but such is not altogether necessary.

My fairing 100 also has provisions for use with a foldable rotor blade. As previously mentioned in connection with FIGS. 1 and 3, blade 50 may be folded about folding hinge 46 to facilitate storage of the aircraft. My fairing includes blade fold fairing section 108, which comprises a leading edge member 250 which is secured in any convenient fashion, such as through support members 252 and 254 (FIG. 2), to pitch horn 68. Blade fold fairing section 108 also consists of top flap member 256 and bottom flap member 258 which, when closed, coact with member 250 to envelop blade 50 about folding hinge 46 with negligible gap therebetween. It will be noted, as best shown in FIGS. 1 and 3, that top flaps 256 and bottom flaps 258 are pivotally connected to sleeve 42 through hinges 260 and 262, respectively.

When it is desired to fold blade 50, flaps 256 and 258 may be pivoted free of the blade folding hinge as shown in phantom in FIGS. 1 and 3, and after the bolt 47 which passes through hinge joint 45 is removed, blade 50 may be folded about folding hinge 46.

Members 250, 256 and 258 of the blade folding portion 108 of the fairing are supported from pitch horn 68 and sleeve 42, respectively, and are, therefore, not attached to either flapping sleeve 106 or lead-lag sleeve 104. For this reason, the blade folding portion 108 of the fairing is the only fairing portion which will move with the blade during pitch change motion. Fairing portions 108 and 106 will move with the blade when the blade flaps, and fairing portions 108, 106 and 104 will move with the blade when the blade hunts.

It will accordingly be seen that my fairing 100 provides an aerodynamic fairing about a fully articulated rotor, permitting the rotor blades 50 to move freely about the feathering, lead-lag and flapping axes, while the fairing snugly engages the rotor and blade so that no drag creating cutouts or apertures are formed.

The various parts of fairing 100 are preferably made of a lightweight, sturdy and easily formed material such as fiberglass.

I have described and shown a fairing for an articulated rotor head. This particular fairing has a lead-lag sleeve attached to the fixed fairing and a flapping sleeve attached to the blade spindle. Those skilled in the art will understand that the flapping sleeve could just as well have been attached to the fixed fairing and the lead-lag sleeve could have been attached to the blade spindle. In either case, the swept surfaces of the sleeves would be generated by circular sections centered on the pivot axes of the respective sleeves.

I have taken the liberty of attaching the lead-lag sleeve to the fixed fairing without regard to the deviation of the corresponding sleeve and blade axes. This was possible only because the blade motions centered upon a point viz., the intersection of the blade flapping and blade lead-lag axis, and the axes of the sleeves could be made to pass through that point. My fairing is not restricted, however, to a rotor-type in which the lead-lag and flapping axes are coincident. If these axes are not coincident, I cannot take liberties with respect to sleeve and blade axes but must instead insure that the corresponding blade and sleeve axes will always remain aligned. Such would have been the case in the disclosed arrangement if the flapping sleeve were attached to the fixed fairing and the lead-lag sleeve were connected to the blade spindle.

Since the blade motions center upon a point in this construction, I could have constructed a single sleeve of spherical shape and suspended it from the blade spindle. The intolerable result of such a design is an excessive fairing height. As clearly indicated by my fairing, the vertical dimensions of the fairing apertures are much smaller than the lateral dimensions to entirely but closely envelop the rotor. By the unique combination of lead-lag and flapping sleeves, I do not obtain an excessive height but acquire a thin, sleek rotor fairing to reduce aerodynamic drag.

It is to be understood that this invention is not limited to the specific embodiment herein illustrated and described but may be used in other ways without departure from its spirit as defined by the following claims.

I claim:

1. In combination in an aircraft,
   (a) a fuselage,
   (b) a rotor head,
   (c) means mounting said rotor head outwardly of said fuselage for rotation about an axis of rotation,
   (d) said rotor head having members for blade attachment which have lead-lag movement about a lead-lag axis substantially parallel to said axis of rotation and which further have flapping movement about a flapping axis substantially perpendicular to said axis of rotation,
(e) rotor blades,
(f) means connecting a rotor blade to each of said members for blade attachment,
(g) rigid fairing means enclosing said rotor head and having a cutout of preselected inner surface shape for each blade,
(h) means mounting said rigid fairing member on said rotor head against tilting relative to said fuselage,
(i) a first sleeve having a preselected inner surface shape and enveloping each of said blades and having an outer surface enveloped by and forming a first socket joint with said rigid fairing cutout inner surface, said first sleeve outer surface and said rigid fairing cutout inner surface shaped so that the area of sweep therebetween is circular in cross section in planes perpendicular to one of said axes,
(j) and a second sleeve enveloping each of said blades and substantially engaging the cross-sectional periphery of each of said blades at one end and being enveloped by and forming a second socket joint with said first sleeve preselected inner surface at the other end,
(k) said first sleeve preselected inner surface and the outer surface of said second sleeve other end shaped so that the area of sweep therebetween is circular in cross section in planes perpendicular to the other of said axes.

2. In combination in an aircraft,
(a) a fuselage,
(b) a rotor head,
(c) means mounting said rotor head outwardly from said fuselage for rotation,
(d) rotor blades,
(e) means connecting said rotor blades to said rotor head for movement about a lead-lag axis and also for movement about a flapping axis,
(f) rigid fairing means enclosing said rotor head and having a cutout for each blade,
(g) means mounting said rigid fairing means on said rotor head,
(h) a plurality of first sleeves each enveloping one of said blades and being shaped and positioned so as to be in close proximity to one of said cutouts and cooperating therewith to form a first socket joint, said first sleeves and said cutouts being shaped so that the areas of sweep therebetween in said first socket joints are circular in sections taken perpendicular to one of said axes,
(i) and a plurality of second sleeves each enveloping one of said blades and having a first end enveloping the blade sectional periphery in close proximity and a second end cooperating with one of said first sleeves and being shaped and positioned so as to be in close proximity thereto and cooperating therewith to form a second socket joint, said sleeves being shaped so that the areas of sweep therebetween in said second socket joints are circular in sections taken perpendicular to the other of said axes.

3. Apparatus according to claim 2 and including sealing means sealing across said socket joints.

4. Apparatus according to claim 2 and including means pivotally connecting each of said first sleeves to said rigid fairing for pivot motion about one of said axes.

5. Apparatus according to claim 2 and including means pivotally connecting said first sleeves to said rigid fairing for pivot motion about said lead-lag axis.

6. Apparatus according to claim 2 and including means connecting said first and second sleeves so that said second sleeves may move with said blades about said flapping axes while free of said first sleeves and further so that said first and second sleeves will move in unison with said blades about said lead-lag axes.

7. Apparatus according to claim 6 and wherein said connecting means is a pin extending from one of said sleeves and a slot in the other of said sleeves positioned to receive said pin.

8. In combination in an aircraft,
(a) a fuselage,
(b) a rotor head,
(c) means mounting said rotor head outwardly from said fuselage for rotation,
(d) rotor blades,
(e) means connecting said rotor blades to said rotor head for movement about a lead-lag axis and for movement about a flapping axis and also for movement about a pitch change axis,
(f) rigid fairing means enclosing said rotor head and having a cutout for each blade,
(g) means mounting said rigid fairing means on said rotor head,
(h) a plurality of first sleeves each enveloping one of said blades and being shaped and positioned so as to be in close proximity to one of said cutouts and cooperating therewith to form a first socket joint, said first sleeves and said cutouts being shaped so that the areas of sweep therebetween in said first socket joints are circular in sections taken perpendicular to one of said lead-lag and flapping axes,
(i) a plurality of second sleeves each enveloping one of said blades and having a first end enveloping the blade sectional periphery in close proximity and a second end cooperating with one of said first sleeves and being shaped and positioned so as to be in close proximity thereto and cooperating therewith to form a second socket joint, said sleeves being shaped so that the areas of sweep therebetween in said second socket joints are circular in sections taken perpendicular to the other of said lead-lag and flapping axes,
(j) and means enveloped within said rigid fairing means and said sleeves to cause said blades to move about said pitch change axes.

9. In combination in an aircraft,
(a) a fuselage,
(b) a rotor head,
(c) means mounting said rotor head outwardly from said fuselage for rotation,
(d) rotor blades each having a folding hinge,
(e) means connecting said rotor blades to said rotor head for movement about a lead-lag axis and also for movement about a flapping axis and also for movement about a pitch change axis,
(f) rigid fairing means enclosing said rotor head and having a cutout for each blade,
(g) means mounting said rigid fairing means on said rotor head,
(h) a plurality of first sleeves positioned between said rotor head and said folding hinges and each enveloping one of said blades and being shaped and positioned so as to be in close proximity to one of said cutouts and cooperating therewith to form a first socket joint, said first sleeves and said cutouts being shaped so that the areas of sweep therebetween in said first socket joints are circular in sections taken perpendicular to one of said lead-lag and flapping axes,
(i) and a plurality of second sleeves positioned between said rotor head and said folding hinges and each enveloping one of said blades and having a first end enveloping the blade sectional periphery in close proximity and a second end cooperating with one of said first sleeves and being shaped and positioned so as to be in close proximity thereto and cooperating therewith to form a second socket joint, said sleeves being shaped so that the areas of sweep therebebetween in said second socket joints are circular in sections taken perpendicular to the other of said lead-lag and flapping axes, (j) and means enveloped within said rigid fairing means and said sleeves to cause said blades to move about said pitch change axes, (k) and retractable fairing memans enveloping said blades about said folding hinges and connected to said blades for rotation therewith about said pitch change axis.

10. Apparatus according to claim 9 and including a sleeve connected to said blade for pitch change motion therewith and wherein said retractable fairing means includes a top member hinged to said sleeve and a bottom member hinged to said sleeve.

11. In combination in an aircraft,
(a) a fuselage,
(b) a rotor head,
(c) means mounting said rotor head outwardly from said fuselage for rotation,
(d) rotor blades,
(e) means connecting said rotor blades to said rotor head for movement about a lead-lag axis and also for movement about a flapping axis,
(f) rigid fairing means enclosing said rotor head and having a cutout for each blade and also having an inspection aperture therein,
(g) a removable inspection plate covering said inspection aperture,
(h) means mounting said rigid fairing means on said rotor head,
(i) a plurality of first sleeves each enveloping one of said blades and being shaped and positioned so as to be in close proximity to one of said cutouts and cooperating therewith to form a first socket joint, said first sleeves and said cutouts being shaped so that the areas of sweep therebetween in said first socket joints are circular in sections taken perpendicular to one of said axes,
(j) and a plurality of second sleeves each enveloping one of said blades and having a first end enveloping the blade sectional periphery in close proximity and a second end cooperating with one of said first sleeves and being shaped and positioned so as to be in close proximity thereto and cooperating therewith to form a second socket joint, said sleeves being shaped so that the areas of sweep therebetween in said second socket joints are circular in sections taken perpendicular to the other of said axes.

12. In combination in an aircraft,
(a) a rotor head rotatable about an axis of rotation,
(b) rotor blades,
(c) means connecting said blades to said rotor head so that said blades are capable of flapping motion and lead-lag motion,
(d) a rigid fairing enveloping said rotor head and having cutouts therein through which said blades pass,
(e) a plurality of first sleeves each enveloping one of said blades and projecting through one of said cutouts in close proximity thereto,
(f) a plurality of second sleeves each enveloping one of said blades and projecting through one of said first sleeves in close proximity thereto,
(g) and means mounting said pluralities of sleeves so that the sleeves of one of said pluralities will move with said blades in one of said flapping and lead-lag motions and, further, so that the sleeves of both of said pluralities will move with said blades in the other of said flapping and lead-lag motions.

13. In combination in an aircraft,
(a) a rotor head rotatable about an axis of rotation,
(b) rotor blades,
(c) means connecting said blades to said rotor head so that said blades are capable of flapping motion and lead-lag motion and pitch change motion,
(d) a rigid fairing enveloping said rotor head and having cutouts therein through which said blades pass,
(e) a plurality of first sleeves each enveloping one of said blades and projecting through one of said cutouts in close proximity thereto,
(a) a plurality of second sleeves each enveloping one of said blades and projecting through one of said first sleeves in close proximity thereto,
(g) and means mounting said pluralities of sleeves so that the sleeves of one of said pluralities will move with said blades in one of said flapping and lead-lag motions and, further, so that the sleeves of both of said pluralities will move with said blades in the other of said flapping and lead-lag motions,
(h) a third plurality of sleeves each enveloping one of said blades and positioned separately from and outwardly of said second plurality of sleeves,
(i) and means for mounting said third plurality of sleeves for movement with said blades in pitch change, lead-lag and flapping motion.

14. Apparatus according to claim 13 and wherein each of said blades has a folding hinge and, further, wherein each of said sleeves of said third plurality envelops said blade about said folding hinge and, still further, wherein each of said sleeves of said third plurality is segmented and movably mounted to be movable away from said blade to permit blade folding.

15. In combination in an aircraft,
(a) a rotor head rotatable about an axis of rotation,
(b) rotor blades,
(c) means connecting said blades to said rotor head so that said blades are capable of flapping motion about a flapping axis and lead-lag motion about a lead-lag axis,
(d) a rigid fairing enveloping said rotor head and having cutouts therein through which said blades pass,
(e) a plurality of first sleeves each enveloping one of said blades and projecting through one of said cutouts,
(f) a plurality of second sleeves each enveloping one of said blades and projecting through one of said first sleeves,
(g) and means mounting said first sleeves so that said first sleeves will move with said blades in lead-lag motion only and, further, so that second sleeves will move with said blades in both flapping and lead-lag motions.

16. In combination in an aircraft,
(a) a rotor head rotatable about an axis of rotation,
(b) rotor blades,
(c) means connecting said blades to said rotor head so that said blades are capable of flapping motion about a flapping axis and lead-lag motion about a lead-lag axis and pitch change motion about a feathering axis,
(d) a rigid fairing enveloping said rotor head and having cutouts therein through which said blades pass,
(e) a plurality of first sleeves each enveloping one of said blades and projecting through one of said cutouts,
(f) a plurality of second sleeves each enveloping one of said blades and projecting through one of said first sleeves,
(g) means mounting said plurality of first sleeves to said rigid fairing for pivot motion about said lead-lag axis and so that the first sleeves will move with said blades in flapping motion only and, further, so that said second sleeves will move with said blades in both said flapping and lead-lag motions,
(h) a third plurality of sleeves each enveloping one of said blades and positioned separately from and outwardly of said second plurality of sleeves,
(i) and means for mounting said third plurality of sleeves for movement with said blades in pitch change, lead-lag and flapping motion, (j) and wherein each of said blades has a folding hinge and, further, wherein each of said sleeves of said third plurality envelops said blade about said folding hinge and, still further, wherein each of said sleeves of said third plurality is segmented and movably mounted to be movable away from said blade to permit blade folding.

17. In combination in an aircraft,
(a) a rotor head rotatable about an axis of rotation,
(b) rotor blades,
(c) means connecting said blades to said rotor head,
(d) a rigid fairing enveloping said rotor head and mounted thereon for rotation therewith about the axis of rotation and having cutouts therein through which said blades pass,
(e) a plurality of first sleeves each enveloping one of said blades and projecting through one of said cutouts in close proximity thereto,
(f) a plurality of second sleeves each enveloping one of said blades and projecting through one of said first sleeves in close proximity thereto,
(g) and means mounting said pluralities of sleeves so that the sleeves of one of said pluralities will move with said blades about axes substantially parallel to the axis of rotation and, further, so that the sleeves of both of said pluralities will move with said blades about axes substantially perpendicular to the axis of rotation.

18. In combination in an aircraft,
(a) a rotor head rotatable about an axis of rotation,
(b) rotor blades,
(c) means connecting said blades to said rotor head so that said blades are capable of flapping motion and lead-lag motion,
(d) a rigid fairing enveloping said rotor head and mounted thereon for rotation therewith about the axis of rotation, and having cutouts therein through which said blades pass,
(e) a plurality of first sleeves each enveloping one of said blades and projecting through one of said cutouts in close proximity thereto,
(f) a plurality of second sleeves each enveloping one of said blades and projecting through one of said first sleeves in close proximity thereto,
(g) and means mounting said pluralities of sleeves so that the sleeves of one of said pluralities will move with said blades about axes substantially parallel to the axis of rotation and, further, so that the sleeves of the other of said pluralities will move with said blades about axes substantially perpendicular to the axis of rotation.

19. In combination in an aircraft,
(a) a rotor head rotatable about an axis of rotation,
(b) rotor blades,
(c) means connecting said blades to said rotor head,
(d) a rigid fairing enveloping said rotor head and having cutouts therein through which said blades pass,
(e) a plurality of first sleeves each enveloping one of said blades and projecting through one of said cutouts in close proximity thereto,
(f) a plurality of second sleeves each enveloping one of said blades and projecting through one of said first sleeves in close proximity thereto,
(g) and means mounting said pluralities of sleeves so that the sleeves of said first plurality are pivotable with respect to said rigid fairing about a first plurality of parallel axes,
(h) and, further, so that the sleeves of said second plurality are pivotable with respect to said rigid fairing about a second plurality of parallel axes substantially perpendicular to said first plurality of axes.

20. In combination in an aircraft,
(a) a fuselage,
(b) a rotor head,
(c) means mounting said rotor head outwardly from said fuselage for rotation,
(d) rotor blades,
(e) means connecting said rotor blades to said rotor head for movement about a lead-lag axis and also for movement about a flapping axis,
(f) rigid fairing means enclosing said rotor head and having a cutout for each blade,
(g) means mounting said rigid fairing means on said rotor head,
(h) a plurality of first sleeves each having an outer surface and enveloping one of said blades and being shaped and positioned so as to be in close proximity to one of said cutouts and cooperating therewith to form a first socket joint, said outer surfaces of said first sleeves being circular in sections taken perpendicular to one of said axes,
(i) and a plurality of second sleeves each having an outer surface and enveloping one of said blades and having a first end enveloping the blade sectional periphery in close proximity and a second end cooperating with one of said first sleeves and being shaped and positioned so as to be in close proximity thereto and cooperating therewith to form a second socket joint, said outer surfaces of said second sleeves being circular in sections taken perpendicular to the other of said axes.

21. In combination in an aircraft:
(a) a fuselage,
(b) a rotor head,
(c) means mounting said rotor head outwardly from said fuselage for rotation,
(d) rotor blades,
(e) means connecting said rotor blades to said rotor head for movement about a lead-lag axis and also for movement about a flapping axis,
(f) rigid fairing means enclosing said rotor head and having a cutout for each blade,
(g) means mounting said rigid fairing means on said rotor head,
(h) pluralities of sleeves each enveloping one of said blades and said sleeve pluralities having first ends enveloping the sectional periphery of each blade in close proximity and having second ends shaped and positioned so as to be in close proximity to one of said cutouts and cooperating therewith to form socket joints, said second ends having outer surfaces which are circular in sections taken perpendicular to one of said axes, and each of said sleeve pluralities having adjacent sleeves with overlapping ends shaped and positioned to be in close proximity and cooperating to form a second socket joint, said adjacent sleeves being shaped so that the areas of sweep therebetween in said second socket joints are circular in sections taken perpendicular to the other of said axes.

No references cited.

MARTIN P. SCHWADRON, *Primary Examiner.*

E. A. POWELL, *Assistant Examiner.*